United States Patent
Keller et al.

(10) Patent No.: US 9,953,457 B2
(45) Date of Patent: Apr. 24, 2018

(54) SYSTEM, METHOD, AND COMPUTER PROGRAM PRODUCT FOR PERFORMING PATH SPACE FILTERING

(71) Applicant: NVIDIA Corporation, Santa Clara, CA (US)

(72) Inventors: Alexander Keller, Berlin (DE); Ken Patrik Dahm, Berlin (DE); Nikolaus Binder, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 321 days.

(21) Appl. No.: 14/166,794

(22) Filed: Jan. 28, 2014

(65) Prior Publication Data

US 2014/0313198 A1 Oct. 23, 2014

Related U.S. Application Data (60) Provisional application No. 61/814,734, filed on Apr. 22, 2013.

(51) Int. Cl.
 *G06T 15/06* (2011.01)
 *G06T 15/50* (2011.01)

(52) U.S. Cl.
 CPC ............ *G06T 15/506* (2013.01); *G06T 15/06* (2013.01)

(58) Field of Classification Search
 CPC ................................ G06T 15/50; G06T 15/06
 See application file for complete search history.

(56) References Cited

U.S. PATENT DOCUMENTS

| 8,638,331 B1* | 1/2014 | Jarosz ................... G06T 15/06 345/426 |
| 2005/0264564 A1 | 12/2005 | Keller |
| 2012/0200570 A1* | 8/2012 | Hanamoto ........... G06T 15/506 345/426 |

(Continued)

FOREIGN PATENT DOCUMENTS

| CN | 1991916 A | 7/2007 |
| CN | 102521870 A | 6/2012 |
| WO | 2012047681 A2 | 4/2012 |

OTHER PUBLICATIONS

Georgiev et al., Light Transport Simulation with Vertex Connection and Merging, Nov. 1, 2012, ACM Transactions on Graphics (TOG)—Proceedings of ACM SIGGRAPH Asia 2012, vol. 31 Issue 6, pp. 1-10.*

(Continued)

*Primary Examiner* — Matthew Salvucci
(74) *Attorney, Agent, or Firm* — Zilka-Kotab, PC (57) ABSTRACT

A system, method, and computer program product are provided for performing path space filtering. In use, a set of light transport paths associated with a scene is sampled. Additionally, a plurality of vertices associated with the sampled set of light transport paths is selected, where each selected vertex has an associated throughput and light contribution. Further, an averaged light contribution of each of the selected plurality of vertices is determined, utilizing one or more weights. Further still, the averaged light contribution of each of the selected plurality of vertices is combined after multiplying the averaged light contribution of each of the selected vertices by the associated throughput of the vertex.

25 Claims, 6 Drawing Sheets

(56) References Cited

U.S. PATENT DOCUMENTS

2014/0122548 A1    5/2014 Keller

OTHER PUBLICATIONS

Cook et al., "Distributed Ray Tracing," in Computer Graphics, Proceedings of SIGGRAPH 1984, vol. 18, No. 4, Jul. 1984, pp. 137-145.

Jensen, H., "Realistic Image Synthesis Using Photon Mapping," AK Peters, 2001, pp. 1-195.

Keller et al., "Deterministic Consistent Density Estimation for Light Transport Simulation," In J. Dick, F. Kuo, G. Peters, and I. Sloan, editors, Monte Carlo and Quasi-Monte Carlo Methods 2012, Springer, 2013, pp. 1-14.

Keller, A., "A Divide-and-Conquer Algorithm for Simultaneous Photon Map Queries," Poster at High-Performance Graphics in Vancouver, 2011, pp. 1.

Knauer et al., "A Hybrid Approach to Interactive Global Illumination and Soft Shadows," The Visual Computer: International Journal of Computer Graphics, vol. 26, Issue 6-8, 2010, pp. 1-10.

Kontkanen et al., "Irradiance Filtering for Monte Carlo Ray Tracing," In D. Talay and H. Niederreiter, editors, Monte Monte Carlo Methods 2004, Springer, 2004, pp. 1-14.

Krivanek et al., "Practical Global Illumination with Irradiance Caching," Synthesis lectures in computer graphics and animation, Morgan & Claypool, 2009, pp, 1-148.

Krivanek, J., "Radiance Caching for Global Illumination Computation on Glossy Surfaces," PhD thesis, Czech Technical University, Dec. 2005, pp. 1-138.

Lafortune, E., "Mathematical Models and Monte Carlo Algorithms for Physically Based Rendering," PhD thesis, Katholieke Universitiet Leuven, 1996, pp. 1-146.

Lehtinen et al., "Temporal Light Filed Reconstruction for Rendering Distribution Effects," ACM Transactions on Graphics, vol. 30, No. 4, 2011, pp. 1-12.

Lehtinen et al., "Reconstructing the Indirect Light Field for Global Illumination," ACM Transactions on Graphics, vol. 31, No. 4, 2012, pp. 1-10.

Shepard, D., "A Two-Dimensional Interpolation Function for Irregularly-Spaced Data," In Proceedings of the 1968 23rd ACM National Conference, 1968, pp. 517-524.

Silverman, B., "Density Estimation for Statistics and Data Analysis," Published in Monographs on Statistics and Applied Probability, 1986, pp. 1-22.

Spanier et al., "Quasi-Random Methods for Estimating Integrals Using Relatively Small Samples," SIAM Review, vol. 36, No. 1, Mar. 1994, pp. 18-44.

Suykens et al., "Adaptive Filtering for Progressive Monte Carlo Image Rendering," In WSCG 2000 Conference Proceedings, 2000, pp. 1-8.

Teschner et al., "Optimized Spatial Hashing for Collision Detection of Deformable Objects," In Proceedings of VMVâ€™03, 2003, pp. 1-8.

Wald et al., "Interactive Global Illumination Using Fast Ray Tracing," Thirteenth Eurographics Workshop on Rendering, 2002, pp. 1-11.

Ward et al., "A Ray Tracing Solution for Diffuse Interreflection," In Computer Graphics, 1988, pp. 1-8.

Wyman et al., "Simple Analytic Approximations to the CIE XYZ Color Matching Functions," Journal of Computer Graphics Techniques, vol. 2, No. 2, 2013, pp. 1-11.

Light Cache, Nov. 16, 2013, pp. 1-4, retrieved from http://help.chaosgroup.com/vray/help/150SP1/render_params_lightmap.htm.

Irradiance Map, Jul. 30, 2013, pp. 1-7, retrieved from http://help.chaosgroup.com/vray/help/150SP1/ender_params_advancedimap.htm.

Powell et al., "Weighted Uniform Sampling—A Monte Carlo Technique for Reducing Variance," IMA J. Appl. Math., vol. 2, No. 3, pp. 1-9.

Keller, A., "Quasi-Monte Carlo Methods for Photorealistic Image Synthesis," Thesis, University of Kaiserslautern, 1998, pp. 1-137.

* cited by examiner

SYSTEM, METHOD, AND COMPUTER PROGRAM PRODUCT FOR PERFORMING PATH SPACE FILTERING

CLAIM OF PRIORITY

This application claims the benefit of U.S. Provisional Application No. 61/814,734, filed Apr. 22, 2013, the entire contents of which is incorporated herein by reference.

FIELD OF THE INVENTION

The present invention relates to computer graphics, and more particularly to performing light transport simulation.

BACKGROUND

Light transport simulation is a popular technique used in image generation. For example, light transport simulation may deliver photorealistic images when implemented during modeling with physical entities like cameras, lights, and materials on top of a surface of a scene. However, current techniques for performing light transport simulation have been associated with various limitations.

For example, depending on the complexity of a model, the noise inherent with simulation algorithms may vanish at a slow rate over the course of computation. There is thus a need for addressing this and/or other issues associated with the prior art.

SUMMARY

A system, method, and computer program product are provided for performing path space filtering. In use, a set of light transport paths associated with a scene is sampled. Additionally, a plurality of vertices associated with the sampled set of light transport paths is selected, where each selected vertex has an associated throughput and light contribution. Further, an averaged light contribution of each of the selected plurality of vertices is determined, utilizing one or more weights. Further still, the averaged light contribution of each of the selected plurality of vertices is combined after multiplying the averaged light contribution of each of the selected vertices by the associated throughput of the vertex.

DETAILED DESCRIPTION

Figure 1:
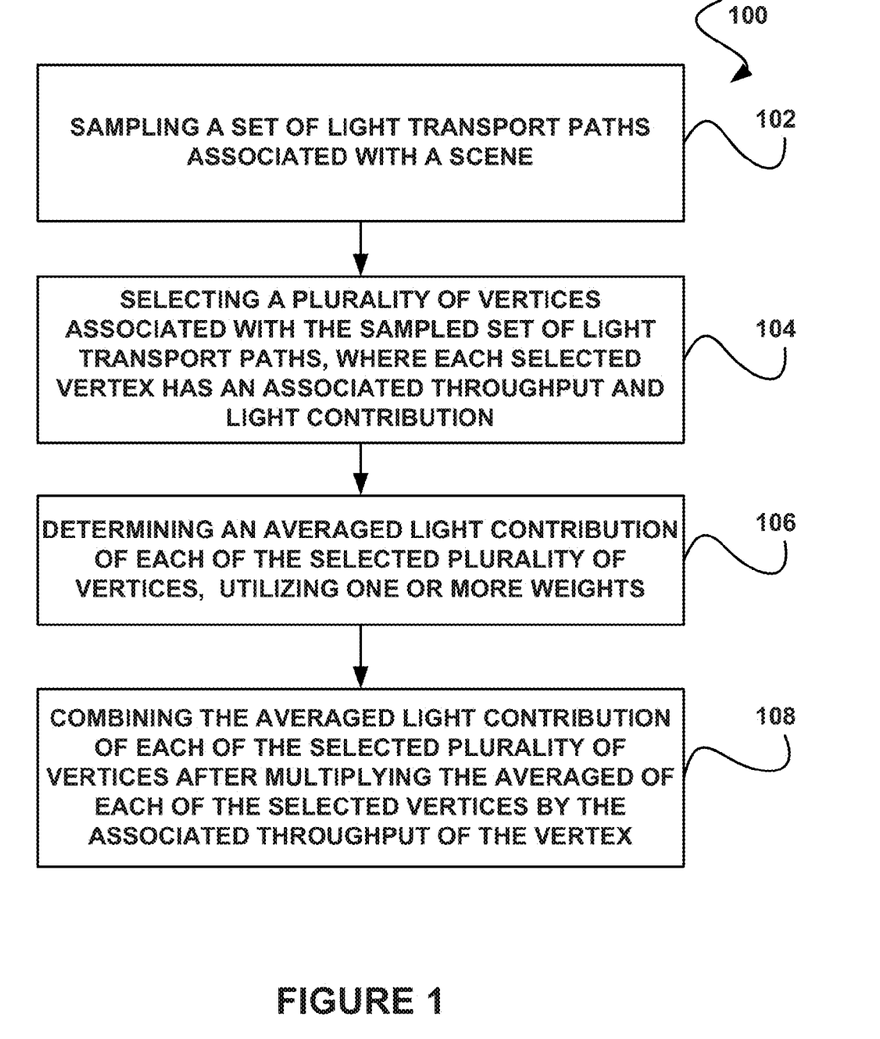
FIG. 1 shows a method for performing path space filtering, in accordance with one embodiment.

FIG. 1 shows a method 100 for performing path space filtering, in accordance with one embodiment. As shown in operation 102, a set of light transport paths associated with a scene is sampled. In one embodiment, the scene may include a graphical scene to be rendered. In another embodiment, the set of light transport paths may be sampled from a total number of light transport paths associated with the scene.

Additionally, in one embodiment, a light transport path of the scene may include a ray or path of light travelling through the scene (e.g., through pixels of the scene, etc.). For example, the light path may start at a light source and may travel through the scene until it reaches a camera. In another embodiment, sampling the set of light transport paths may include selecting a plurality of paths from the total number of light transport paths associated with the scene. In yet another embodiment, the sampling of the light transport paths may be performed according to any criteria. For example, the set of light transport paths may be sampled by one or more actions, including one or more of generating eye paths, generating light paths, and connecting one or more eye paths and light paths by one or more of shadow rays and proximity. In still another embodiment, the light transport paths may include light transport paths with vertices in one or more of participating media and translucent matter.

Further, as shown in operation 104, a plurality of vertices associated with the sampled set of light transport paths is selected, where each selected vertex has an associated throughput and light contribution. In one embodiment, each vertex may indicate a point of intersection within the scene. For example, a vertex associated with a light transport path may indicate a point of intersection between the light transport path and a surface within the scene.

Further still, in one embodiment, the light contribution of each vertex may include an amount of light contributed by the associated light transport path at the vertex. In another embodiment, the throughput associated with each vertex may include the accumulated attenuation of light as transported from that vertex to at least one of a camera or a screen.

Also, in one embodiment, the sampled set of light transport paths may be locally filtered. For example, one or more light transport paths within the sampled sets may be removed according to one or more criteria. In another embodiment, the filtering may be performed before the determining of the averaged light contribution of each of the selected plurality of vertices.

In addition, in one embodiment, the filtering of the light transport paths may be performed according to any criteria. For example, the filtering may include the sampling of one or more of the light transport paths utilizing one or more of a random, pseudo-random, or quasi-random selection of the samples to be filtered. In this way, the local filtering may improve an efficiency of a numerical integro-approximation that is being performed.

Furthermore, in one embodiment, filtering the sampled light transport paths may further include performing one or more additional actions. For example, for the i-th light transport path within the sampled set of light transport paths, at least one vertex $x_i$, an attenuation $\alpha_i$ along an eye path segment to the vertex $x_i$, and a radiance contribution $c_i$ of a light path segment to the vertex $x_i$ may be stored.

Further still, in one embodiment, filtering the sampled light transports paths may further include performing one or more accumulations. Table 1 illustrates $\bar{c}_i$, which is used during the formation of an image by accumulating $\alpha_i \bar{c}_i$, in accordance with one embodiment. Of course, it should be noted that the illustration of $\bar{c}_i$ shown in Table 1 is set forth for illustrative purposes only, and thus should not be construed as limiting in any manner.

TABLE 1

$$\overline{c}_i := \frac{\sum_{j=0}^{b^m-1} \chi_{\mathcal{B}(n)}\left(x_{\lfloor \frac{i}{b^m}\rfloor b^m+j} - x_i\right) \cdot w_{i,j} \cdot c_{\lfloor \frac{i}{b^m}\rfloor b^m+j}}{\sum_{j=0}^{b^m-1} \chi_{\mathcal{B}(n)}\left(x_{\lfloor \frac{i}{b^m}\rfloor b^m+j} - x_i\right) \cdot w_{i,j}}$$

Also, in one embodiment, in the context of Table 1, $\mathcal{B}$ may have a radius r(n) around the vertex $x_i$. In another embodiment, the radius r(n) may be chosen by at least one of a distance along a path or a solid angle. In yet another embodiment, the radiance contribution $c_i$ may be averaged with an associated wavelength $\lambda_i$ to consistently simulate spectral light transport. Further, Table 2 further illustrates properties of the radius r(n), in accordance with one embodiment. Of course, it should be noted that the properties of the radius r(n) shown in Table 2 is set forth for illustrative purposes only, and thus should not be construed as limiting in any manner.

TABLE 2

$$r^2(n) := \frac{r_0^2}{n^\alpha} \text{ for } \alpha \in (0, 1)$$

Additionally, in one embodiment, the plurality of vertices may be selected utilizing a range search. In another embodiment, the range search may be performed by at least one of a hash grid, a classic range search, and a divide-and-conquer method.

Further still, as shown in operation 106, an averaged light contribution of each of the selected plurality of vertices is determined, utilizing one or more weights. In one embodiment, the one or more weights may alter the averaged light contribution of one or more of the selected plurality of vertices. In another embodiment, each of the one or more weights may measure a similarity between one or more of the selected plurality of vertices, where such similarity depends on one or more of a geometric similarity, a transport similarity, and a visibility similarity between one or more of the selected plurality of vertices.

Also, as shown in operation 108, the averaged light contribution of each of the selected plurality of vertices is combined after multiplying the averaged light contribution of each of the selected vertices by the associated throughput of the vertex. In one embodiment, the selecting, determining, and combining may be repeated in an iterative manner. In another embodiment, the selecting, determining, filtering, and combining may be implemented as a progressive method.

Additionally, in one embodiment, the selecting, determining, filtering, and combining may be applied across multiple views for one or more of rendering stereo image pairs, rendering multiple frames in an animation, and rendering a set of images required for one or more light field displays. In another embodiment, motion blur may be simulated by averaging one or more images at one or more distinct points in time.

Further, in one embodiment, sampling the set of light transport paths may be decoupled from one or more shading operations. In another embodiment, locally filtering the sampled set of light transport paths may be performed linearly and may be applied on top of a sampling based rendering engine. In yet another embodiment, the sampling of the set of light transport paths may be performed by one or more of a random, pseudo-random, or quasi-random sampling.

In this way, combining the averaged light contribution of each of the selected plurality of vertices may be performed during a light transport simulation, and the local filtering may improve an efficiency of the light transport simulation. Additionally, an image to be rendered may be identified, and path tracing may be performed during such rendering, where path space filtering is performed in conjunction with the path tracing.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
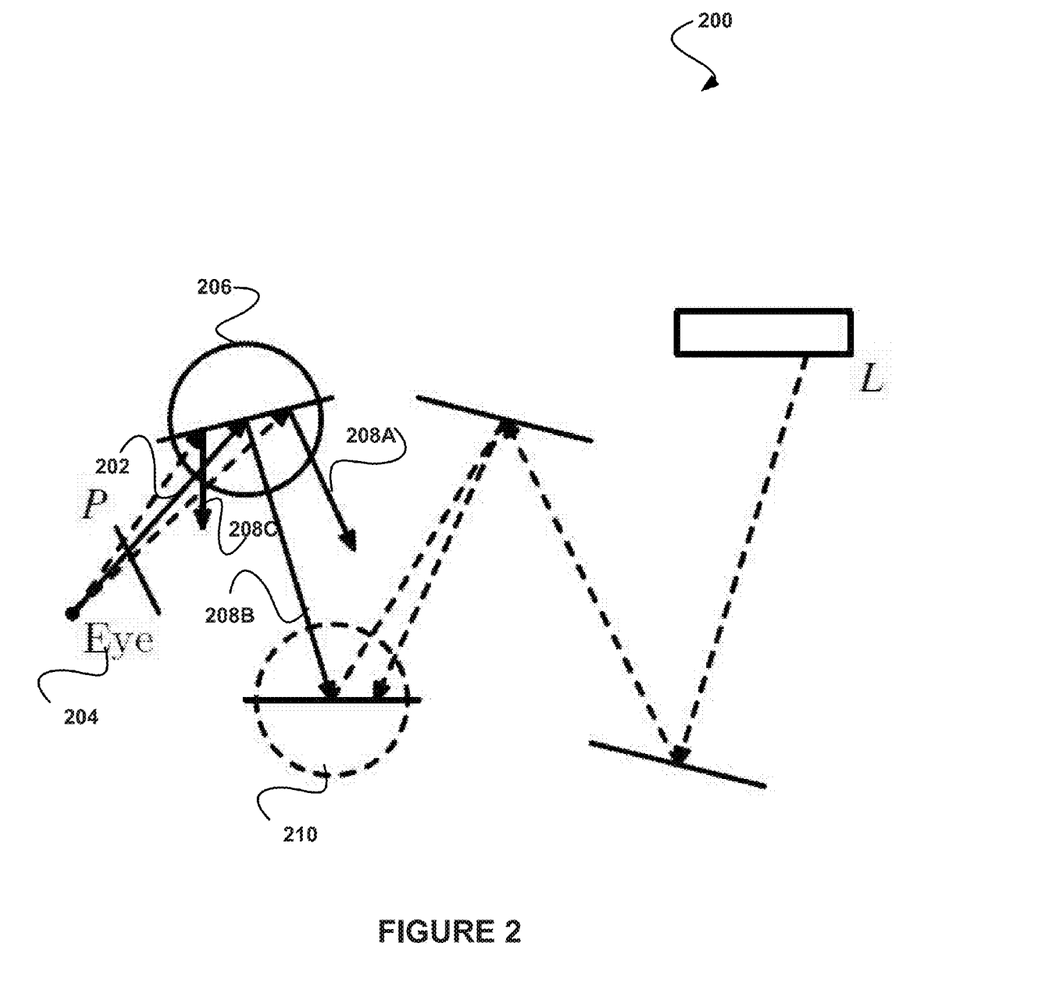
FIG. 2 shows an exemplary illustration of path space filtering, in accordance with another embodiment.

FIG. 2 shows an exemplary illustration 200 of path space filtering, in accordance with another embodiment. As an option, the path space filtering in the illustration 200 may be carried out in the context of the functionality of FIG. 1. Of course, however, the path space filtering in the illustration 200 may be implemented in any desired environment. It should also be noted that the aforementioned definitions may apply during the present description.

As shown, following a ray 202 (represented as a solid line) from an eye 204, the contribution of the ray 202 is determined by averaging the contributions of all paths with vertices in the solid ball 206 around its point of intersection. The contributing path segments 208A-C are indicated by exiting solid arrows. This is dual to photon mapping (see the dashed circle 210), where incident path segments are connected to a query ray. In analogy to progressive photon mapping, the radius of this ball must vanish with the number of samples in order to result in a consistent algorithm.

Modeling with physical entities like cameras, lights, and materials on top of the scene surface, light transport simulation may deliver photorealistic images. The above path space filtering image synthesis method may converge without persistent approximation artifacts, may only have a tiny set of parameters, and may provide noise reduction similar to approximative methods.

Caching samples of irradiance and interpolating them to increase the efficiency of light transport simulation is a technique that may be implemented in a renderer. See, for example, "A Ray Tracing Solution for Diffuse Interreflection" (Ward et al., In Computer Graphics, pages 85-90, 1988) and "Practical Global Illumination with Irradiance Caching" (Krivanek et al., Synthesis lectures in computer graphics and animation. Morgan & Claypool, 2009), which are hereby incorporated by reference in their entirety. Some elements to be addressed may include artifacts due to the interpolation of cached irradiance samples that are not yet converged, and scintillation in animations whenever adaptive samples cannot be placed in a coherent way over time. See, for example, "Radiance Caching for Global Illumination Computation on Glossy Surfaces" (J. Krivanek, Ph.d. thesis, Universit'e de Rennes 1 and Czech Technical University in Prague, December 2005), which is hereby incorporated by reference in its entirety.

A light cache stores illumination samples computed in the vertices of a path tracer in a preprocess. See, for example, "http://www.spot3d.com/vray/help/150SP1/render params lightmap.htm" and "http://www.spot3d.com/vray/help/150SP1/render params advancedimap.htm," which are hereby incorporated by reference in their entirety. Then, the efficiency of the subsequent rendering phase may be increased by interpolating global illumination from stored illumination samples. Optionally, these samples may be filtered to reduce noise. Instead of relying on interpolation, a discontinuity buffer may reduce variance by averaging the irradiance of neighboring pixels across similar locations. See, for example, "Quasi-Monte Carlo Methods for Photorealistic Image Synthesis" (A. Keller, PhD thesis, University of Kaiserslautern, Germany, 1998) and "Interactive Global Illumination using Fast Ray Tracing" (Wald et al., In P. Debevec and S. Gibson, editors, Rendering Techniques 2002 (Proc. 13th Eurographics Workshop on Rendering), pages 15-24, 2002), which are hereby incorporated by reference in their entirety.

The ideas of irradiance caching and filtering may be merged, where a simple discontinuity metric may be used in a weighted average to determine the irradiance by filtering instead of interpolation. See, for example, "Irradiance filtering for Monte Carlo ray tracing" (Kontkanen et al., Monte Carlo and Quasi-Monte Carlo Methods 2004, pages 259-272. Springer, 2004), which is hereby incorporated by reference in its entirety.

In one embodiment, a very sparse set of samples may provide sufficient information for high quality image synthesis. Instead of sampling the original integrand, a function that is much cheaper to sample may be reconstructed from a sparse set of samples of the original integrand. See, for example, "Temporal light field reconstruction for rendering distribution effects" (Lehtinen et al., ACM Trans. Graph., 30(4), 2011) and "Reconstructing the indirect light field for global illumination." (Lehtinen et al., ACM Trans. Graph., 31(4), 2012), which are hereby incorporated by reference in their entirety.

Figure 3:
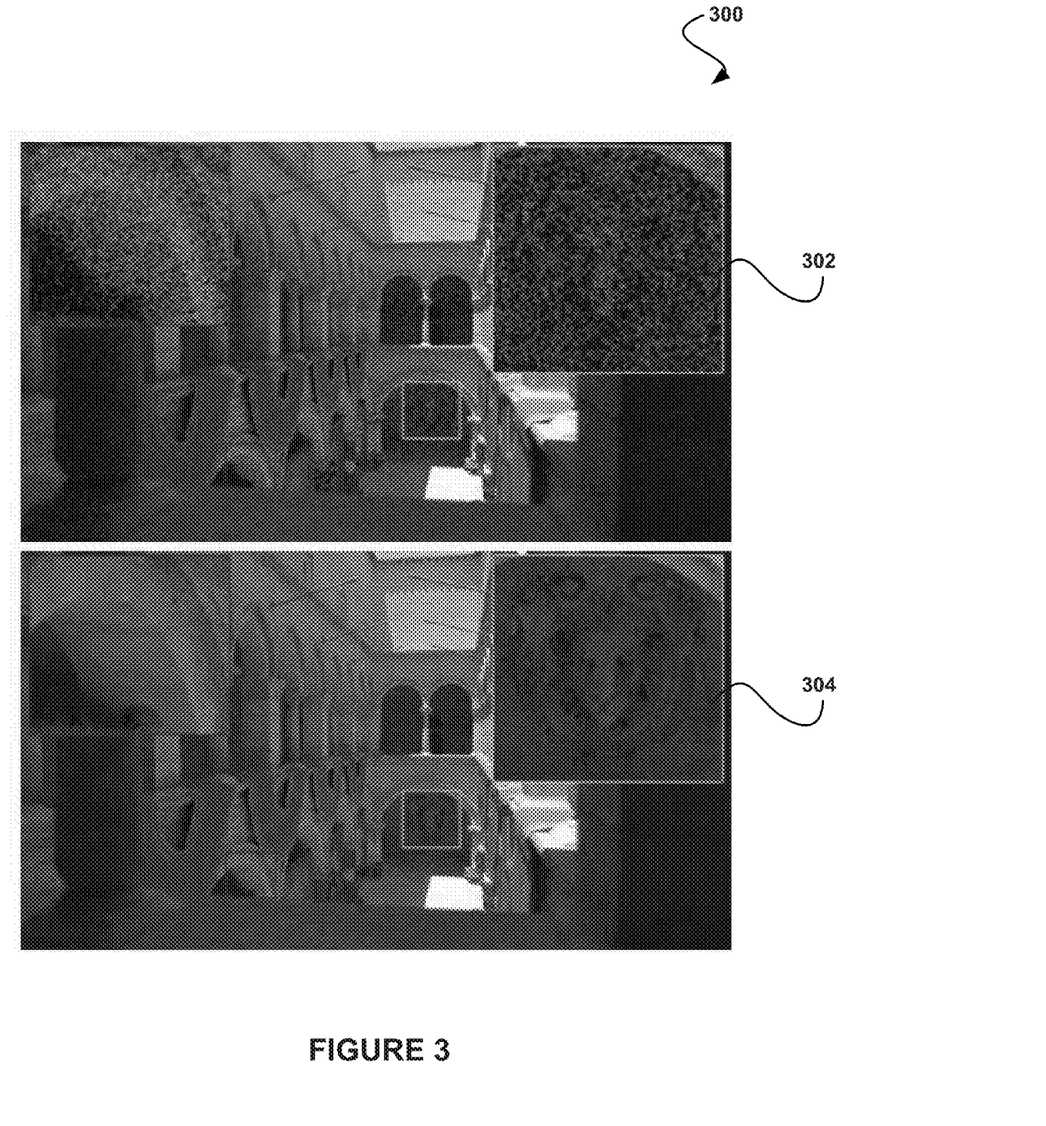
FIG. 3 displays a first impression of a resulting gain in performance using path space filtering, in accordance with another embodiment.

Instead of sampling from a reconstruction, an efficient scheme may directly filter the path space samples. The deterministic algorithm may have a tiny set of parameters, may be consistent in order to avoid persistent artifacts and parameter tuning, may be simple to implement, and may unite the advantages of other work. A first impression of the resulting gain in performance may be seen in FIG. 3, which shows a comparison 300 of results from path tracing 302 and path tracing with path space filtering 304.

Algorithm

In one embodiment, one low discrepancy sequence may be enumerated to sample contiguous blocks of $b^m \in \mathbb{N}$ light transport paths. The total number of light transport paths may be counted by the integer n. See, for example, "Deterministic consistent density estimation for light transport simulation" (Keller et al., Monte Carlo and Quasi-Monte Carlo Methods 2012, pages 467-480, Springer, 2013), which is hereby incorporated by reference in its entirety.

For the i-th light transport path, at least one vertex $x_i$, the attenuation $\alpha_i$ along the eye path segment to that vertex, and the radiance contribution $c_i$ of the light path segment to that vertex may be stored. In another embodiment, at least one of a first vertex as seen from the camera or a first vertex along the path from the camera that is considered sufficiently diffuse may be stored as tuple $(x_i, \alpha_i, c_i)$. In yet another embodiment, at least one of none or all vertices may be stored as tuples.

The image may be formed by accumulating $\alpha_i \cdot \bar{c}_i$. Table 3 illustrates the weighted average contribution $\bar{c}_i$, in accordance with one embodiment. Of course, it should be noted that the illustration of $\bar{c}_i$ shown in Table 3 is set forth for illustrative purposes only, and thus should not be construed as limiting in any manner.

TABLE 3

$$\bar{c}_i := \frac{\sum_{j=0}^{b^m-1} \chi_{\mathcal{B}(n)}\left(x_{\lfloor \frac{i}{b^m} \rfloor b^m + j} - x_i\right) \cdot w_{i,j} \cdot c_{\lfloor \frac{i}{b^m} \rfloor b^m + j}}{\sum_{j=0}^{b^m-1} \chi_{\mathcal{B}(n)}\left(x_{\lfloor \frac{i}{b^m} \rfloor b^m + j} - x_i\right) \cdot w_{i,j}}$$

Table 4 illustrates the definition of $\bar{c}_i$, in accordance with one embodiment. Of course, it should be noted that the definition of $\bar{c}_i$ shown in Table 4 is set forth for illustrative purposes only, and thus should not be construed as limiting in any manner.

TABLE 4

$\bar{c}_i$ is defined as the ratio of the sum of the weighted contributions $w_{i,j} \cdot c_{\lfloor \frac{i}{b^m} \rfloor b^m + j}$ and the sum of the weights $w_{i,j}$ of all vertices $x_{\lfloor \frac{i}{b^m} \rfloor b^m + j}$ in a ball $\mathcal{B}$ of radius r(n) around $x_i$ (as selected by the characteristic function $\chi_{\mathcal{B}(n)}$).

Table 5 illustrates properties of the radius r(n) used in path space filtering, in accordance with one embodiment. Of course, it should be noted that the properties of the radius r(n) shown in Table 5 is set forth for illustrative purposes only, and thus should not be construed as limiting in any manner.

TABLE 5

$$r^2(n) := \frac{r_0^2}{n^\alpha} \text{ for } \alpha \in (0, 1)$$

In one embodiment, the parameter $r_0$ may be an initial radius. In another embodiment, the radius may decrease arbitrarily slowly, and therefore $\alpha = \frac{1}{2}$ may include a robustly working choice. Postulating non-zero weights, any vanishing radius may guarantee $\lim_{n \to \infty} \bar{c}_i = c_i$ and thus consistency, because as the characteristic function $\chi_{\mathcal{B}}$ (n) is centered in $x_i$, it may always select the i-th path at least.

In one embodiment, the computation step of the weighted average contribution $\bar{c}_i$ as illustrated in Table 3 may be iterated a selected number of times, which may result in a smoothing of the contributions. For example, a first iteration step may use $\bar{c}_i$ instead of the $c_i$ in the computation of a weighted average contribution as illustrated in Table 3 to compute an iterated contribution $\bar{\bar{c}}_i$. Such an iterative step may be repeated a selected number of times.

The vertices may efficiently be queried by a range search using a hash grid, a classic range search utilizing a kd-tree built over the stored vertices $x_i$, a bounding volume hierarchy, or a divide-and-conquer method that may simultaneously consider all vertices. Note that the sets of query and data points may be identical, which may increase data locality and may simplify implementation. See, for example, "Optimized spatial hashing for collision detection of deformable objects" (Teschner et al., In Proceedings of VMV'03, Munich, Germany, pages 47-54, 2003), and "A Divide-and-Conquer Algorithm for Simultaneous Photon Map Queries" (Keller et al., Poster at High-Performance Graphics in Vancouver, 2011), which are hereby incorporated by reference in their entirety.

Additionally, differences may exist between methods used for scattered data interpolation and weighted uniform sampling. For example, an interpolation property $\bar{c}_i = c_i$ may inhibit any averaging right from the beginning. In another example, $b^m \ll \infty$, because $b^m$ may be proportional to the memory footprint. See, for example, "A two-dimensional interpolation function for irregularly-spaced data" (D. Shepard, In Proceedings of the 1968 $23^{rd}$ ACM National Conference, pages 517-524. ACM, 1968), and "A hybrid approach to interactive global illumination and soft shadows" (Knauer et al., The Visual Computer: International Journal of Computer Graphics, 26(6-8):565-574, 2010), which are hereby incorporated by reference in their entirety. Also, see, for example, "Weighted uniform sampling—a Monte Carlo technique for reducing variance" (Powell et al., IMA J. Appl. Math., 2(3):228-236, 1966), and "Quasi-random methods for estimating integrals using relatively small samples" (Spanier et al., SIAM Review, 36(1):18-44, March 1994), which are hereby incorporated by reference in their entirety.

Parameters

The principle two parameters to control an implementation of the progressive algorithm are the size of the memory footprint and the initial radius $r_0$. In one embodiment, the memory block to store all the vertices of one pass may be chosen as large as possible in order to include as many vertices and thus contributions in the averaging process as possible. The improvements with increasing memory footprint at the same number of path space samples include variance reduction and anti-aliasing of geometric detail. As the memory consumption may be proportional to the block size $b^m$, it may be straightforward to determine the maximum natural number m given the size of the vertices and the maximum size of a memory block.

The initial radius $r_0$ may depend on the query location $x_i$. For example, it may be derived from the definition of the solid angle $$\Delta \omega := \frac{\pi r_0^2}{d^2}$$

of a disk of radius $r_0$ in $x_i$ perpendicular to a ray at a distance d from the ray origin. Table 6 illustrates an initial radius used in path space filtering, in accordance with one embodiment. Of course, it should be noted that the properties of the initial radius shown in Table 6 are set forth for illustrative purposes only, and thus should not be construed as limiting in any manner.

TABLE 6

$$r_0 = \sqrt{\frac{d^2 \Delta \omega}{\pi}} \sim d$$

In one embodiment, for a fixed solid angle $\Delta \omega$, the initial radius $r_0$ may be proportional to the distance d. The factor of proportionality may be either chosen by the user or can be determined using a given solid angle. For example, $\Delta \omega$ may be chosen as the solid angle determined by the area of 3×3 pixels on the screen with respect to the focal point.

Note that considering an anisotropic footprint may not be practical for several reasons: The requirement of dividing by the cosine between surface normal in $x_i$ and the ray direction may cause numerical issues for vectors that are close to perpendicular. In addition the efficiency of the range search may be decreased, as now the query volume may have an arbitrarily large extent. Finally, this may result in possibly averaging contributions from vertices that are spatially far apart, although the local environment of the vertex $x_i$ may be small such as for example in foliage or hair.

As fewer and fewer contributions are averaged with decreasing radius, there is a point in time, where actually no averaging takes place any longer as only the central vertex $x_i$ is included in the queries. On the one hand, this may lead to the intuition that comparing the maximum of the number of averaged contributions to a threshold may be utilized to automatically switch off the algorithm. On the other hand, it indicates that the initial radius may need to be selected sufficiently large in order to include a meaningful number of contributions in the weighted averages.

Figure 4:
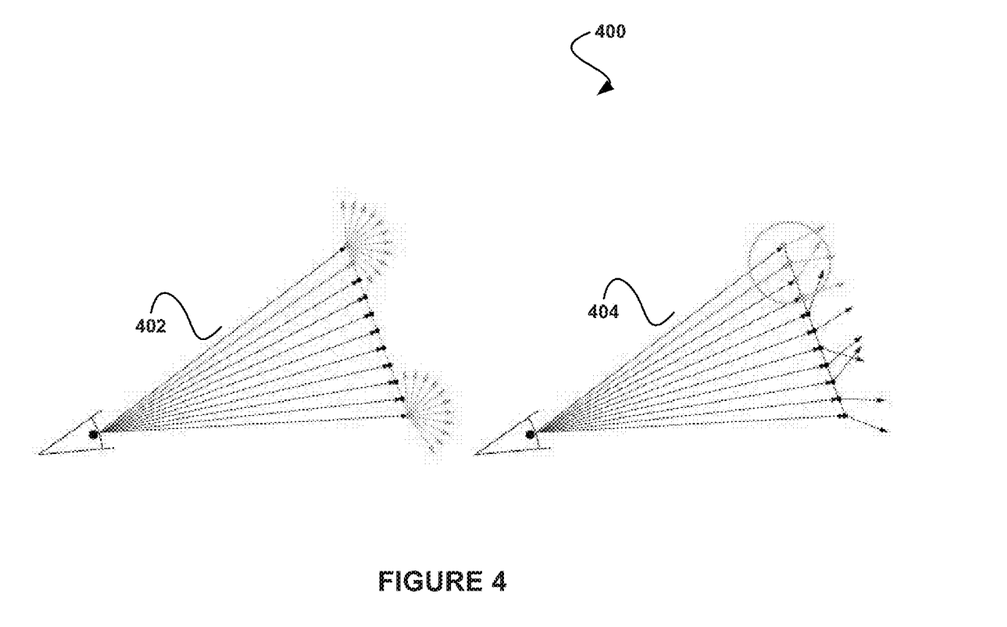
FIG. 4 illustrates a schematic illustration of the difference in principle between irradiance interpolation and path space filtering, in accordance with another embodiment.

The initial radius therefore also may be determined by a given maximum number of contributions to include in the average. FIG. 4 illustrates a schematic illustration 400 of the difference in principle between irradiance interpolation 402 and path space filtering 404. Instead of interpolating cached samples that are smoothed by trajectory splitting to determine the radiance of the point seen by the highlighted ray from the eye, path space filtering 404 averages the contributions of paths in the proximity.

Weights

In one embodiment, using only uniform weights $w_{i,j} \equiv 1$ may result in very visible blur, because contributions may be included in the average that actually never could have been gathered in $x_i$. As path space filtering may mimic trajectory splitting, contributions $$c_{\lfloor \frac{i}{b^m} \rfloor b^m + j}$$

that were likely to be generated by trajectory splitting in $x_i$ should receive higher weights than those that were not. Such non-uniform weights $w_{i,j}$ may be constructed as product weights composed of the heuristics as used for the discontinuity buffer, photon mapping, irradiance interpolation, and light field reconstruction. See, for example, "Realistic Image Synthesis Using Photon Mapping." (H. Jensen, A K Peters, 2001), which is hereby incorporated by reference in its entirety.

Blur Across Geometry

The scalar product $$n_{\lfloor \frac{i}{b^m} \rfloor b^m + j} \cdot n_i \in [-1, 1]$$

determines the similarity of the normals $$n_{\lfloor \frac{i}{b^m} \rfloor b^m + j} \text{ in } x_{\lfloor \frac{i}{b^m} \rfloor b^m + j}$$

and $n_i$ in $x_i$. While contributions with negative scalar product may be excluded in order to prevent light leaking through the backside of an opaque surface, a positive threshold (e.g., 0.95 in one implementation) may be used to exclude more contributions from the average, which may help to ameliorate quality issues encountered with geometric or approximate surface normals.

Blur Across Textures

The images may be most crisp, if for all contributions included in the average the BSDF would be evaluated in $x_i$ (e.g., similar to a discontinuity buffer). In situations where this evaluation is too costly or even not feasible, the algorithm may rely on data stored during initial shader evaluation. Shaders may return a color term, which is the BSDF multiplied by the ratio of the cosine between surface normal and direction of incidence and the probability density function (pdf) evaluated for the directions of transport. For the example of cosine distributed samples on diffuse surfaces only the diffuse albedo remains, because all other terms cancel. Unless a norm of the difference of these terms in $$x_{\lfloor \frac{i}{p^n} \rfloor p^m + j}$$

and $x_i$ is above a threshold (e.g., 0.05 in one implementation), the contribution of $$x_{\lfloor \frac{i}{p^n} \rfloor p^m + j}$$

may be included in the average. For similar directions of reflection, this may reduce the blur across texture details and incorrect in-scattering on glossy materials. While similar directions of observation may be implicit for query locations as directly seen from the eye, for general paths and glossy surfaces, this similarity may be considered explicitly by also comparing directions of observation, which may require additional memory to store such vectors.

Blurred Shadows

Given a point light source, its visibility as seen from $x_i$ and $$x_{\lfloor \frac{i}{p^n} \rfloor p^m + j}$$

may be either identical or different. In order to avoid sharp shadow boundaries to be blurred, contributions may be only included upon identical visibility. For ambient occlusion and illumination by an environment map, blurred shadows may be reduced by comparing the lengths of each one ray shot into the hemisphere at $x_i$ and $$x_{\lfloor \frac{i}{p^n} \rfloor p^m + j}$$

to a threshold.

Using norms to directly weight the contributions may result in higher variance. In a similar way, using kernels (e.g., kernels used in the domain of smoothed particles hydrodynamics (SPH)) other than the characteristic function $\chi \mathcal{B}$ (n) to weight contributions by their distance to the query location $x_i$ increases the variance. See, for example, "Density Estimation for Statistics and Data Analysis" (B. Silverman, Chapman & Hall/CRC, 1986), which is hereby incorporated by reference in its entirety. This can be explained by the fact that under the assumption of perfect importance sampling, each path segment created by trajectory splitting may have been included with the same weight. As path space filtering is mimicking trajectory splitting, weights other than binary weights may increase variance. Using only (binary) weights that are either zero or one, the denominator of the ratio in Table 1 may amount to the number of included contributions.

Applications

In this way, improvements may be achieved by the straightforward application of the algorithm to path space samples of a path tracer with next event estimation and implicit multiple importance sampling. See, for example, "Mathematical Models and Monte Carlo Algorithms for Physically Based Rendering" (E. Lafortune, PhD thesis, Katholieke Universitiet Leuven, Belgium, 1996), which is hereby incorporated by reference in its entirety. The lighting may consist of an environment map and light sources. The first hit points as seen from the camera may be stored as the vertices $x_i$. As opposed to irradiance interpolation methods, path space filtering may efficiently average contributions across discontinuities of detailed geometry. Even in such a difficult setting, the improvements may be substantial.

Note that since the algorithm is linear, it may work for any decomposition of path space including any variant of multiple importance sampling. In addition, the algorithm may be applied across vertices generated from multiple views. As such, rendering depth of field, stereo pairs of images, or multiple views of a scene may greatly benefit from the new algorithm and vertices may be shared among all frames of an animation of a static scene. In fact, the nature of the weighted average contribution $\bar{c}_i$ of Table 1 may allow one to average vertices from any kind of path space samples.

Path space filtering may overcome the need for excessive trajectory splitting in virtually all common use cases in rendering: Instead of branching paths yielding ray trees, contributions may be filtered across basis functions of BSDF models represented by a linear combination of basis functions. See, for example, "Distributed Ray Tracing" (Cook et al., In Computer Graphics (Proc. SIGGRAPH 1984), pages 137-145, 1984, which is hereby incorporated by reference in its entirety. Local averages in $x_i$ as for example ambient occlusion, shadows from extended and/or many light sources, final gathering, smoothing photon maps or radiosity solutions, ray marching, or effects like depth of field simulation may be determined directly from path space samples. This may match the observation that efficiency of trajectory splitting decreases with increasing sampling rates.

Furthermore, path space filtering may enhance methods to deal with so-called fire flies, because the contribution of fire flies may be attenuated by the number of contributions included in the average. Visible transient artifacts then may look more like splotches instead of single bright pixels.

Animations

A common artifact in animations rendered with interpolation methods may be scintillation due to for example temporally incoherent cached samples, approximate cached samples, or temporal changes in visibility. In such situations, parameters may have to be tweaked, which may require repeated computation from scratch. As the path space filtering is consistent, visible artifacts may be transient. In addition, the algorithm may be deterministic and linear. It therefore may be sufficient to store the number of the last block or sample processed with each frame in order to selectively refine any frame by just continuing computations.

Motion Blur

The consistent simulation of motion blur may be realized by averaging images at distinct points in time. See, for example, U.S. application Ser. No. 13/666,888, filed Nov. 1, 2012, which is hereby incorporated by reference in its entirety. As an alternative, extending the range search to include proximity in time may allow for averaging across vertices with different points in time. In cases where linear motion is a sufficient approximation and storing linear motion vectors is affordable, reconstructing the visibility may improve the speed of convergence.

Spectral Rendering

The consistent simulation of spectral light transport may be realized by averaging monochromatic contributions $c_i$ with an associated wavelength $\lambda_i$. The projection onto a suitable color system may happen during the averaging process, where the suitable basis functions are multiplied as factors to the weights. One example of such a set of basis functions are the XYZ color system response curves. An exemplary continuous approximation of such response curves may be given in "Simple Analytic Approximations to the CIE XYZ Color Matching Functions" (Chris Wyman, Peter-Pike Sloan, and Peter Shirley, *Journal of Computer Graphics Techniques (JCGT)*, vol. 2, no. 2, 1-11, 2013. Available online http://jcgt.org/published/0002/02/01/), which is hereby incorporated by reference in its entirety.

Participating Media and Translucency

The efficiency of the consistent simulation of participating media and translucency may be improved using path space filtering. As path space filtering may be a linear algorithm, it may be applied to combine contributions of any kind of light transport paths, which may include light transport paths with vertices in participating media and translucent matter.

Decoupling Sampling from Shading

Decoupling sampling from shading may be realized in a straightforward fashion by sampling more eye path segments with query locations $x_i$ and attenuations $\alpha_i$, however, lacking contributions $c_i$, which may allow for increased anti-aliasing at the same shading rates. As such path segments may not be guaranteed to include any contribution, they may not count in the accumulation process in case of empty queries. See, for example, "Adaptive filtering for progressive Monte Carlo image rendering" (Suykens et al., I In WSCG 2000 Conference Proceedings, 2000), which is hereby incorporated by reference in its entirety.

Figure 5:
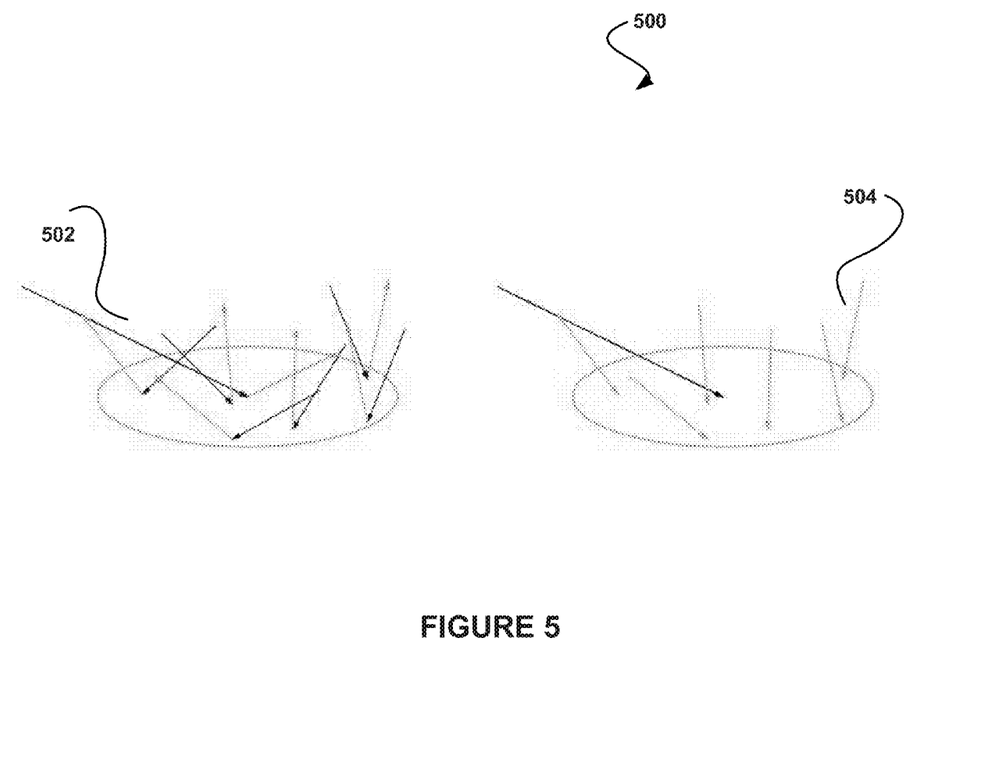
FIG. 5 illustrates a comparison between path space filtering and photon mapping, in accordance with another embodiment.

FIG. 5 illustrates a comparison 500 between path space filtering 502 and photon mapping 504. As an option, the comparison 500 may be carried out in the context of the functionality of FIGS. 1-4. Of course, however, the comparison 500 may be implemented in any desired environment. It should also be noted that the aforementioned definitions may apply during the present description.

In one embodiment, path space filtering 502 may be considered a variance reduction technique dual to photon mapping 504. In path space filtering 502, the contribution to a vertex may be computed by dividing the sum of contributions of exitant path segments with vertices in the proximity by their number. Photon mapping 504 may determine the ratio of the flux of incident path segments (photon hits) and the disk area.

Path space filtering 502 may be orthogonal in the sense that it may be used on top of any (path space) sample based rendering algorithm. It may overcome the necessity of trajectory splitting, which may enable path tracing using the fire-and-forget paradigm as may be required for efficient parallel light transport simulation. The progressive algorithm may be simple to implement, efficient, and may be guaranteed to converge without persistent artifacts due to consistency.

In one embodiment, path space filtering 502 may result in a dramatic reduction in variance when applied to general path tracing. In another embodiment, processing more path space samples per pass may allow for more efficient variance reduction, as well as better anti-aliasing. In yet another embodiment, path space filtering can smooth reflected caustics in a rendered image. Path space filtering may also remove substantial amounts of noise, even across complex geometry.

The efficiency of quasi-Monte Carlo integro-approximation for light transport simulation may be improved by locally filtering path space samples before averaging them. This filter may be constructed such that in the limit the original integro-approximation problem may be solved.

Figure 6:
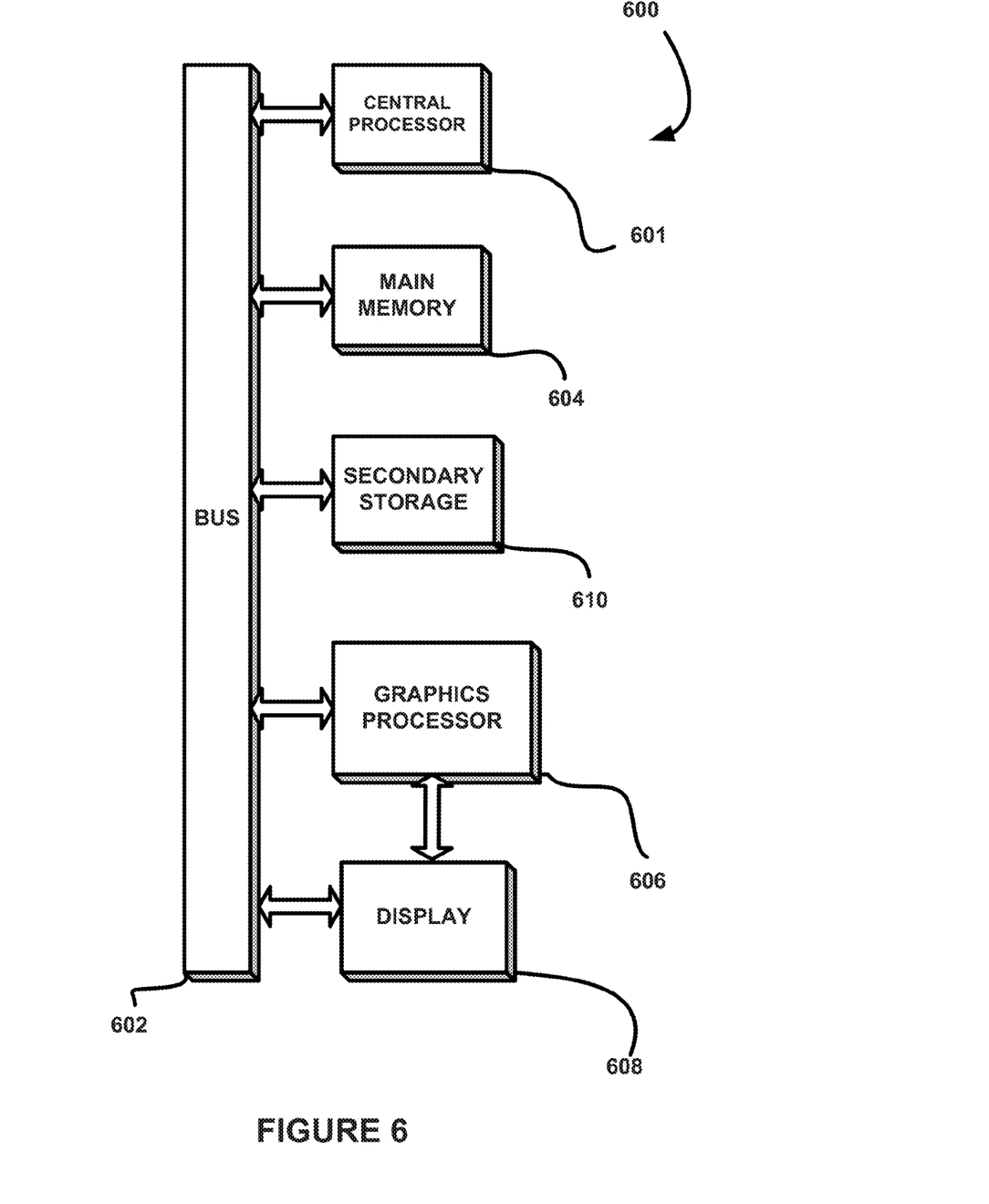
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. The system may also be realized by reconfigurable logic which may include (but is not restricted to) field programmable gate arrays (FPGAs).

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610, volatile or non-volatile storage, and/or any other type of storage are possible examples of non-transitory computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, and/or any other type of logic. Still yet, the system 600 may take the form of various other devices including, but not limited to a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
sampling a set of light transport paths associated with a scene;
selecting a plurality of vertices associated with the sampled set of light transport paths, wherein each selected vertex in the plurality of vertices is associated with a throughput and a light contribution;
determining an averaged light contribution of each selected vertex in the plurality of vertices, utilizing one or more weights, wherein the averaged light contribution for a particular selected vertex is calculated based on the light contributions for vertices in proximity to the particular selected vertex;
combining the averaged light contribution $\bar{c}$ of each selected vertex in the plurality of vertices with the throughput $\alpha$ associated with the selected vertex to generate a product, $\alpha \cdot \bar{c}$, for the selected vertex, wherein the throughput associated with each selected vertex includes an accumulated attenuation of light as transported from that vertex to at least one of a camera or a screen;
forming an image by accumulating the product for each selected vertex in the plurality of vertices; and
for the i-th light transport path within the sampled set of light transport paths, storing at least one vertex $x_i$, an attenuation $\alpha_i$ along an eye path segment to the vertex $x_i$, and a radiance contribution $c_i$, of a light path segment to the vertex $x_i$.

2. The method of claim 1, further comprising repeating the selecting, determining, and combining in an iterative manner.

3. The method of claim 1, further comprising locally filtering the sampled set of light transport paths.

4. The method of claim 3, wherein the filtering is performed before the determining of the averaged light contribution of each selected vertex in the plurality of vertices.

5. The method of claim 3, wherein one or more of a random, pseudo-random, or quasi-random selection of the samples to be filtered is performed.

6. The method of claim 3, wherein the local filtering improves an efficiency of a numerical integro-approximation.

7. The method of claim 3, wherein combining the averaged light contribution of each selected vertex in the plurality of vertices is performed during a light transport simulation, and the local filtering improves an efficiency of the light transport simulation.

8. The method of claim 3, wherein locally filtering the sampled set of light transport paths is performed linearly and is applied on top of a sampling based rendering engine.

9. The method of claim 1, wherein the set of light transport paths is sampled by one or more of generating eye paths, generating light paths, and connecting one or more eye paths and light paths by one or more of shadow rays and proximity.

10. The method of claim 1, wherein the method is implemented as a progressive method.

11. The method of claim 1, wherein $\bar{c}_i$ is a ratio of the sum of weighted contributions $$w_{i,j} \cdot c_{\lfloor \frac{i}{b^m} \rfloor b^m + j}$$

and the sum of weights $w_{i,j}$ for all vertices $$x_{\lfloor \frac{i}{b^m} \rfloor b^m + j}$$

in a ball B of radius r(n) around the vertex $x_i$, as selected by a characteristic function $\chi_{B(n)}$, for m contiguous blocks $b^m$ of n light transport paths.

12. The method of claim 11, wherein the radius r(n) of the ball B has the property of $$r^2(n) := \frac{r_0^2}{n^\alpha} \text{ for } \alpha \in (0, 1).$$

13. The method of claim 11, wherein the radius r(n) is chosen by at least one of a distance along a path or a solid angle.

14. The method of claim 13, wherein each of the one or more weights measure a similarity between one or more of the selected plurality of vertices, where such similarity depends on one or more of a geometric similarity, a transport similarity, and a visibility similarity between one or more of the selected plurality of vertices.

15. The method of claim 1, wherein the plurality of vertices are selected utilizing a range search.

16. The method of claim 15, wherein the range search is performed by at least one of a hash grid, a classic range search, and a divide-and-conquer method.

17. The method of claim 1, wherein the method is applied across multiple views for one or more of rendering stereo image pairs, rendering multiple frames in an animation, and rendering a set of images required for one or more light field displays.

18. The method of claim 1, further comprising simulating motion blur by averaging one or more images at one or more distinct points in time.

19. The method of claim 1, wherein sampling the set of light transport paths is decoupled from one or more shading operations.

20. The method of claim 1, wherein the sampling a set of light transport paths is performed by one or more of a random, pseudo-random, or quasi-random sampling.

21. The method of claim 1, further comprising averaging the radiance contribution $c_i$ with an associated wavelength $\lambda_i$ to consistently simulate spectral light transport.

22. The method of claim 1, wherein the light transport paths include light transport paths with vertices in one or more of participating media and translucent matter.

23. The method of claim 1, wherein the determining of an averaged light contribution of each selected vertex in the plurality of vertices, utilizing one or more weights, is iterated.

24. A non-transitory computer-readable storage medium storing instructions that, when executed by a processor, cause the processor to perform steps comprising:
sampling a set of light transport paths associated with a scene;
selecting a plurality of vertices associated with the sampled set of light transport paths, wherein each selected vertex in the plurality of vertices is associated with a throughput and a light contribution;
determining an averaged light contribution of each selected vertex in the plurality of vertices, utilizing one or more weights, wherein the averaged light contribution for a particular selected vertex is calculated based on the light contributions for vertices in proximity to the particular selected vertex; combining the averaged light contribution $\bar{c}$ of each selected vertex in the plurality of vertices with the throughput $\alpha$ associated with the selected vertex to generate a product, $\alpha \cdot \bar{c}$, for the selected vertex, wherein the throughput associated with each selected vertex includes an accumulated attenuation of light as transported from that vertex to at least one of a camera or a screen;
forming an image by accumulating the product for each selected vertex in the plurality of vertices; and
for the i-th light transport path within the sampled set of light transport paths, storing at least one vertex $x_i$, an attenuation $\alpha_i$ along an eye path segment to the vertex $x_i$, and a radiance contribution $c_i$, of a light path segment to the vertex $x_i$.

25. A system comprising:
a processor for:
sampling a set of light transport paths associated with a scene;
selecting a plurality of vertices associated with the sampled set of light transport paths, wherein each selected vertex in the plurality of vertices is associated with a throughput and a light contribution;
determining an averaged light contribution of each selected vertex in the plurality of vertices, utilizing one or more weights, wherein the averaged light contribution for a particular selected vertex is calculated based on the light contributions for vertices in proximity to the particular selected vertex;
combining the averaged light contribution $\bar{c}$ of each selected vertex in the plurality of vertices with the throughput $\alpha$ associated with the selected vertex to generate a product, $\alpha \cdot \bar{c}$, for the selected vertex, wherein the throughput associated with each selected vertex includes an accumulated attenuation of light as transported from that vertex to at least one of a camera or a screen;
forming an image by accumulating the product for each selected vertex in the plurality of vertices; and
for the i-th light transport path within the sampled set of light transport paths, storing at least one vertex $x_i$, an attenuation $\alpha_i$ along an eye path segment to the vertex $x_i$, and a radiance contribution $c_i$, of a light path segment to the vertex $x_i$.

* * * * *